(12) United States Patent
Li et al.

(10) Patent No.: US 12,446,846 B2
(45) Date of Patent: Oct. 21, 2025

(54) RADIATION EXPOSURE DOSE MANAGEMENT APPARATUS, RADIATION EXPOSURE DOSE MANAGEMENT METHOD, AND STORAGE MEDIUM

(71) Applicant: CANON MEDICAL SYSTEMS CORPORATION, Tochigi (JP)

(72) Inventors: Lin Li, Beijing (CN); Chen Wu, Beijing (CN); Qichen Zhu, Beijing (CN); Yongjun Ma, Beijing (CN); Qingyu Yan, Beijing (CN); Yu Guo, Beijing (CN); Xieping Xu, Beijing (CN); Yijin Wang, Beijing (CN)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 227 days.

(21) Appl. No.: 18/065,105

(22) Filed: Dec. 13, 2022

(65) Prior Publication Data

US 2023/0181142 A1    Jun. 15, 2023

(30) Foreign Application Priority Data

Dec. 13, 2021 (CN) .......................... 202111521289.8

(51) Int. Cl.
*A61B 6/03* (2006.01)
*A61B 6/00* (2006.01)

(52) U.S. Cl.
CPC .............. *A61B 6/545* (2013.01); *A61B 6/032* (2013.01); *A61B 6/488* (2013.01); *A61B 6/5217* (2013.01); *A61B 6/542* (2013.01)

(58) Field of Classification Search
CPC ........... A61B 6/03; A61B 6/032; A61B 6/037; A61B 6/488; A61B 6/52; A61B 6/5205;
(Continued)

(56) References Cited

U.S. PATENT DOCUMENTS 6,990,175 B2 * 1/2006 Nakashima ............ A61B 6/032
378/92
7,113,569 B2 * 9/2006 Okumura ............... A61B 6/466
378/150
(Continued)

FOREIGN PATENT DOCUMENTS

JP          2014-113478 A       6/2014
JP          2015-533298 A      11/2015
WO     WO 2012/033002 A1      3/2012

OTHER PUBLICATIONS

Maier, J., et al., "Real-Time Patient-Specific CT Dose Estimation using a Deep Convolutional Neural Network", IEEE, 2018, 3 pages.
(Continued)

*Primary Examiner* — Allen C. Ho
(74) *Attorney, Agent, or Firm* — Oblon, McClelland, Maier & Neustadt, L.L.P.

(57) ABSTRACT

A radiation exposure dose management apparatus according to an embodiment is a radiation exposure dose management apparatus that manages a radiation dose received by a subject and includes processing circuitry configured: to obtain image data of the subject; to segment the image data in accordance with organs of the subject; to generate a voxel radiation dose distribution map indicating a radiation exposure dose of each of the voxels on the basis of a specific radiation exposure dose model and the image data; and to calculate a radiation exposure dose of each of the organs on the basis of the segmented image data and the radiation exposure dose of each of the voxels within the generated voxel radiation dose distribution map.

13 Claims, 13 Drawing Sheets

(58) Field of Classification Search
CPC ....... A61B 6/5211; A61B 6/5217; A61B 6/54; A61B 6/542; A61B 6/544; A61B 6/545; A61N 5/10; A61N 5/103; A61N 5/1031; A61N 2005/1034; A61N 5/1038; A61N 5/1071; A61N 5/1039; A61N 5/1048; A61N 5/1049; A61N 2005/1052; A61N 2005/1061; A61N 5/1064; A61N 5/1065; A61N 5/1067; A61N 2005/1074
USPC .................. 378/8, 65, 95–97, 108; 382/131
See application file for complete search history.

(56) References Cited

U.S. PATENT DOCUMENTS

| | | | | |
|---|---|---|---|---|
| 7,127,030 | B2* | 10/2006 | Tamegai | A61B 6/4233 378/97 |
| 8,812,240 | B2* | 8/2014 | Yu | A61N 5/1031 703/11 |
| 9,044,197 | B2* | 6/2015 | Richard | A61B 6/544 |
| 9,119,560 | B2 | 9/2015 | Kohara | |
| 9,289,627 | B2* | 3/2016 | Otto | A61N 5/1031 |
| 9,295,432 | B2* | 3/2016 | Gerland | A61B 6/542 |
| 9,844,684 | B2* | 12/2017 | Luan | A61N 5/1031 |
| 9,865,048 | B2* | 1/2018 | Wakai | A61N 5/103 |
| 9,913,623 | B2* | 3/2018 | Ohishi | A61N 5/1049 |
| 10,098,606 | B2* | 10/2018 | Star-Lack | A61B 6/5217 |
| 10,238,358 | B2* | 3/2019 | Desponds | A61B 6/542 |
| 10,456,600 | B2* | 10/2019 | Owens | A61N 5/1081 |
| 10,463,317 | B2* | 11/2019 | Tian | A61B 6/032 |
| 10,638,993 | B2* | 5/2020 | Yun | A61B 6/466 |
| 10,821,300 | B2* | 11/2020 | Isola | A61N 5/1081 |
| 11,504,547 | B2* | 11/2022 | Perkó | G16H 15/00 |
| 11,557,390 | B2* | 1/2023 | Hibbard | G16H 20/40 |
| 11,648,418 | B2* | 5/2023 | Owens | A61N 5/1067 378/65 |
| 11,679,274 | B2* | 6/2023 | Peltola | A61N 5/1031 378/65 |
| 11,684,801 | B2* | 6/2023 | Schadewaldt | A61N 5/1038 600/1 |
| 11,717,702 | B2* | 8/2023 | Yuan | G06N 3/08 600/1 |
| 11,826,560 | B2* | 11/2023 | Zhang | A61N 5/1031 |
| 11,918,407 | B2* | 3/2024 | Griffiths | A61B 6/542 |
| 11,964,170 | B2* | 4/2024 | Li | A61N 5/1031 |
| 12,002,204 | B2* | 6/2024 | Wang | G06T 7/0012 |
| 12,045,988 | B2* | 7/2024 | Kuusela | G06T 7/11 |
| 12,067,715 | B2* | 8/2024 | Wang | A61B 6/545 |
| 12,115,386 | B2* | 10/2024 | Voronenko | A61N 5/1084 |
| 12,128,250 | B2* | 10/2024 | Wu | A61N 5/1039 |

OTHER PUBLICATIONS

Lee, M., et al., "Deep-dose: a voxel dose estimation method using deep convolutional neural network for personalized internal dosimetry", Scientific Reports [URL: www.nature.com/scientificreports], Jul. 16, 2019, 9 pages.

* cited by examiner

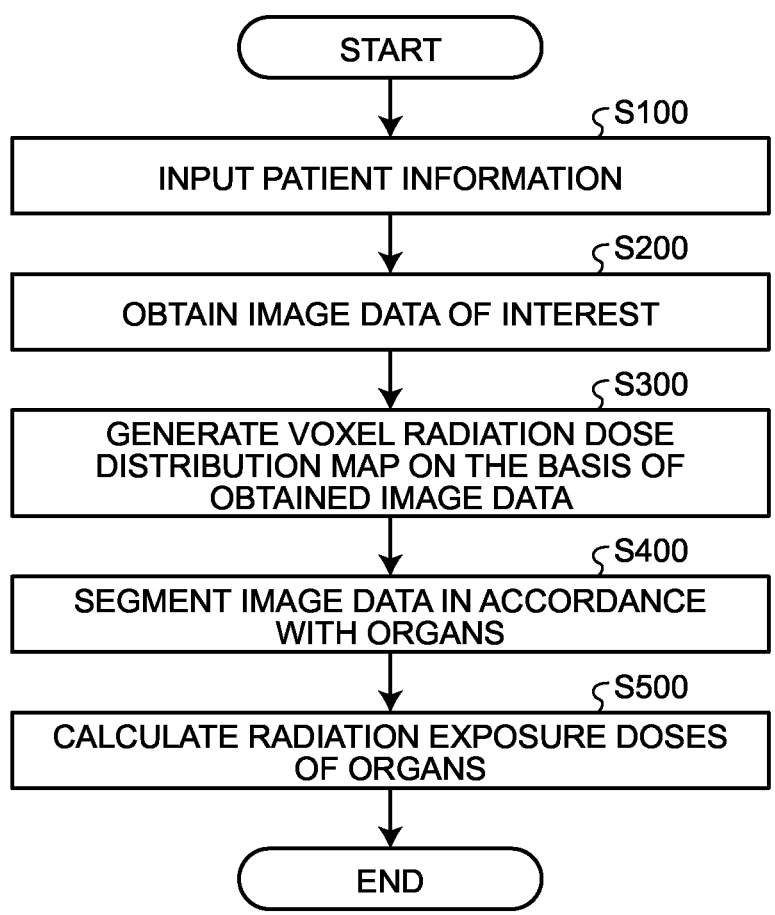

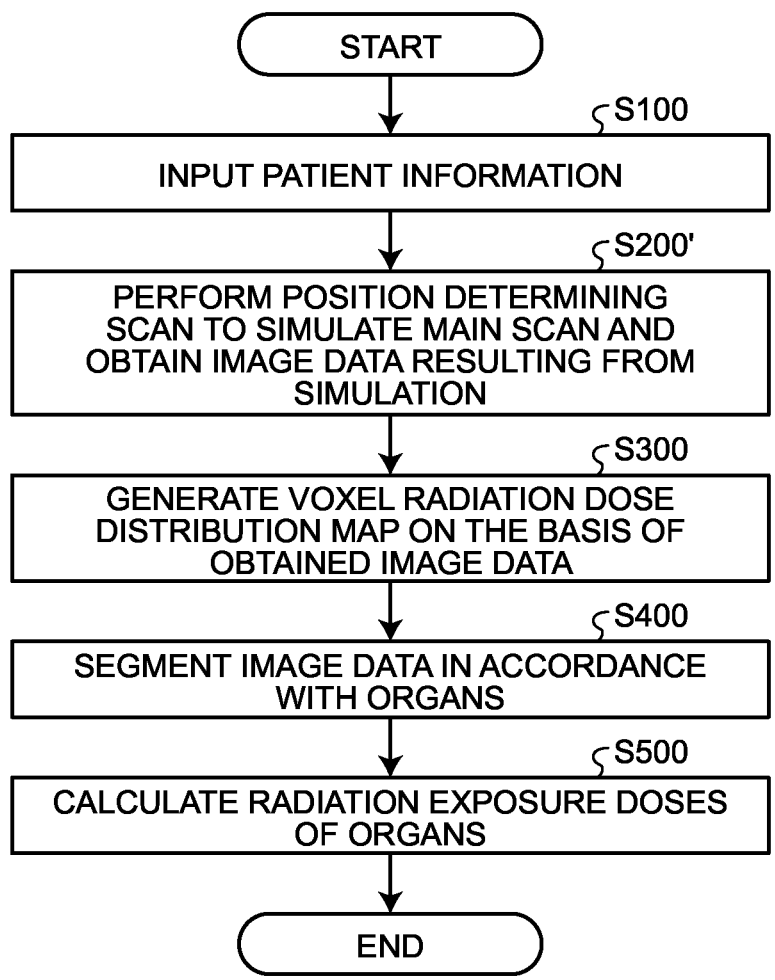

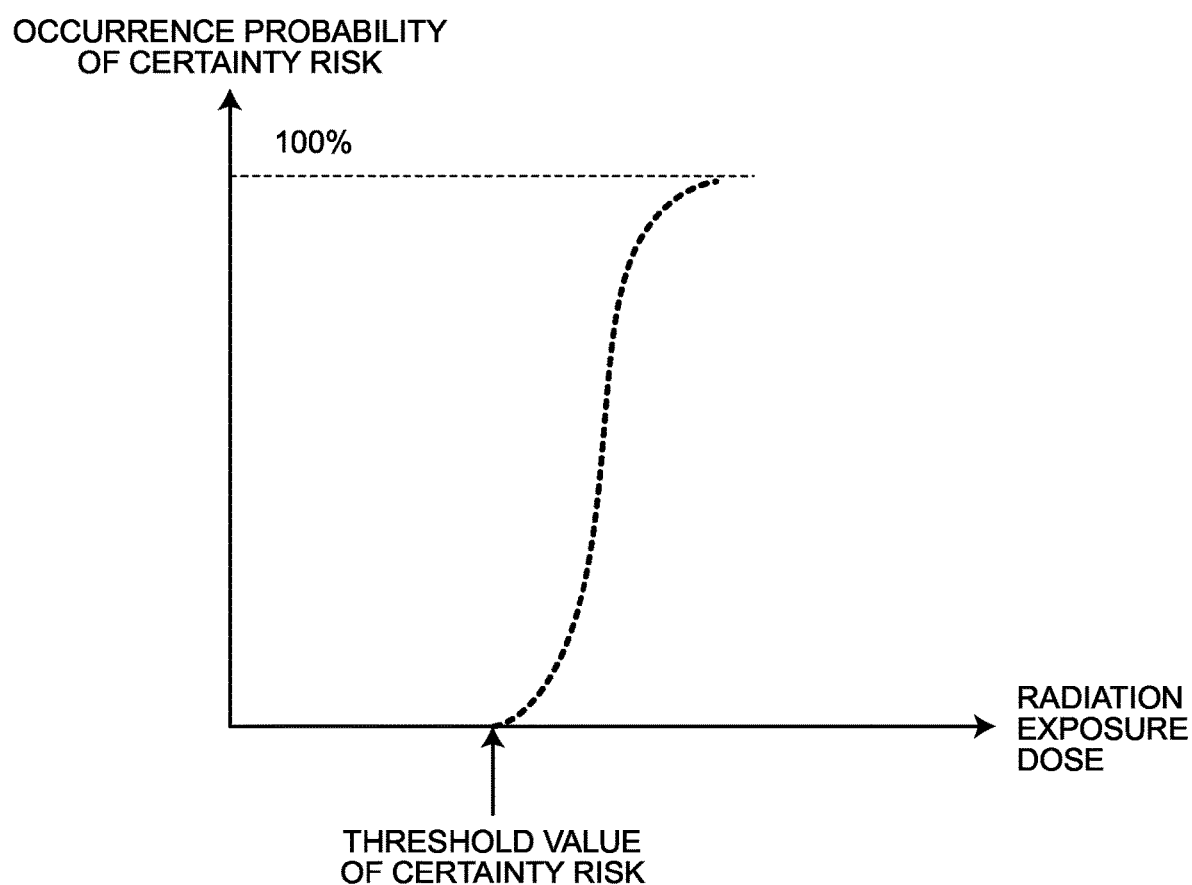

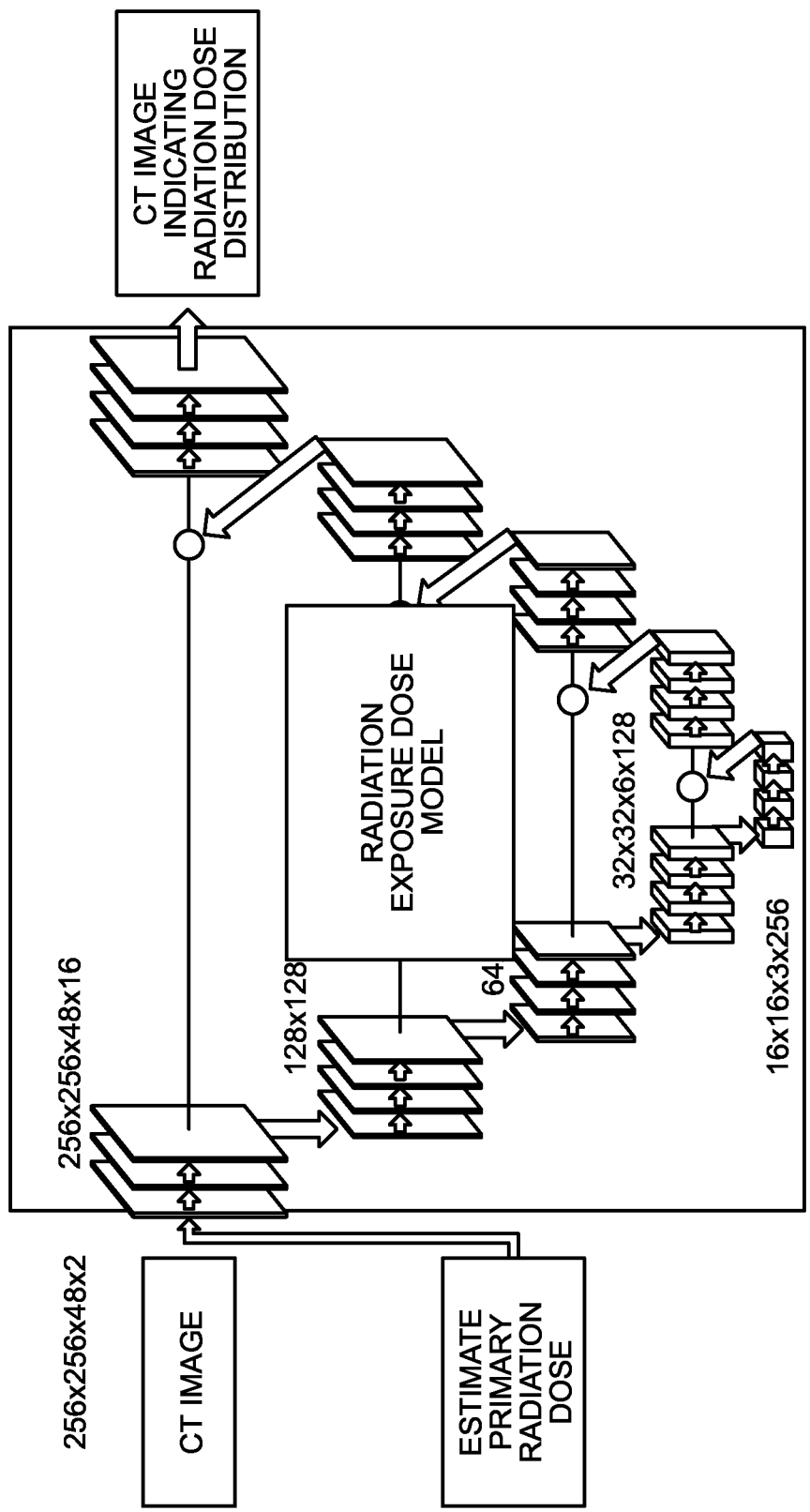

APPLICATION OF TRAINED RADIATION EXPOSURE DOSE MODEL

RADIATION EXPOSURE DOSE MANAGEMENT APPARATUS, RADIATION EXPOSURE DOSE MANAGEMENT METHOD, AND STORAGE MEDIUM

CROSS-REFERENCE TO RELATED APPLICATIONS

This application is based upon and claims the benefit of priority from Chinese Patent Application No. 202111521289.8, filed on Dec. 13, 2021; the entire contents of which are incorporated herein by reference.

FIELD

Embodiments described herein relate generally to a radiation exposure dose management apparatus, a radiation exposure dose management method, and a storage medium.

BACKGROUND

To understand diseases of patients (which may be referred to as "subjects"), X-ray examinations have widely been used. Although X-ray examinations are useful in understanding statuses of diseases, certain impacts such as those of X-ray emission may be imposed on the patients. For this reason, it is important to manage radiation exposure doses of patients, from the viewpoint of keeping radiation exposure doses of patients as small as possible.

At the time of a Computed Tomography (CT) scan, a scan console is configured to provide a CT Dose Index volume (CTDIvol) value or a Dose-Length Product (DLP) value, on the basis of a selected program protocol. When the value indicating a radiation exposure dose exceeds a threshold value, performing another scan will not be permitted. A radiologist reviews the scan plan, and if it is determined that another scan is possible, he/she enters a reason for continuing the scan.

As illustrated in L3 of FIG. 10, as a conventional technique, a method is known by which a radiation exposure dose received inside a circular column-shaped acquisition region is calculated, under conditions such as patient information L1 and scan parameters L2. This method is not a method aiming for a radiation exposure dose of a specific organ. Further, when scan ranges overlap with one another, an accumulated radiation exposure dose is calculated by adding together average radiation exposure dose values in the overlapping scan ranges. Consequently, according to this method, it is not possible to accurately calculate the radiation dose received by organs sensitive to radiation.

BRIEF DESCRIPTION OF THE DRAWINGS

FIG. 3 is a flowchart illustrating a management method implemented by the radiation exposure dose management apparatus according to the first embodiment;

FIG. 4 is a flowchart illustrating a management method implemented by a modification example of the radiation exposure dose management apparatus according to the first embodiment;

FIG. 8 is a schematic chart for explaining a certainty risk;

FIG. 9A is a schematic chart illustrating a training process of a radiation exposure dose model;

DETAILED DESCRIPTION

Figure 1A:
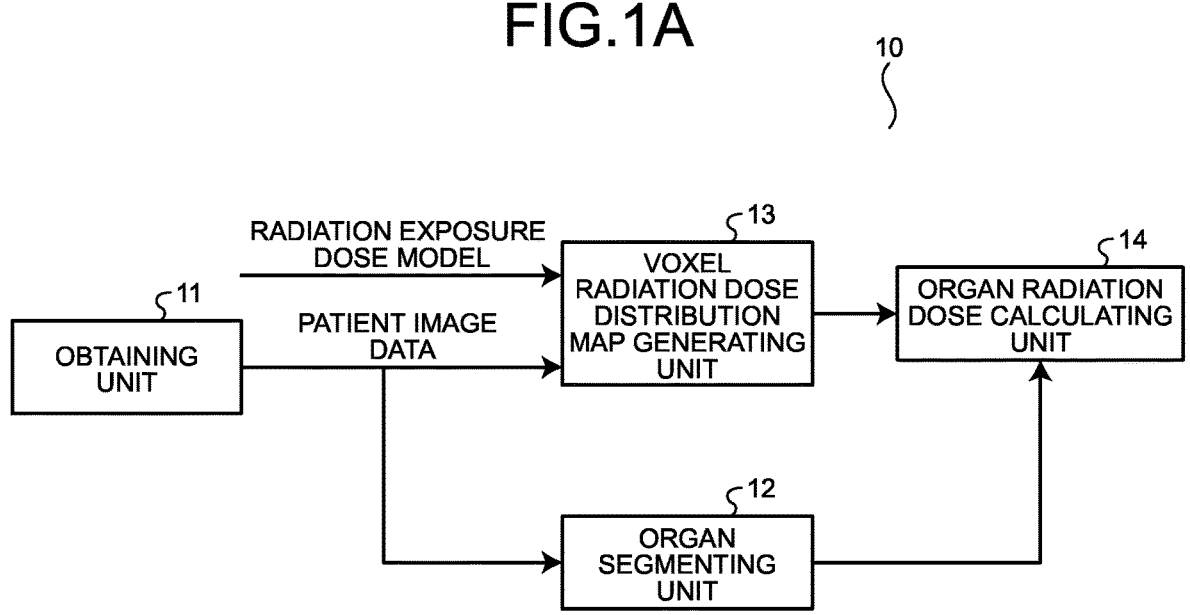
FIG. 1A is a schematic diagram illustrating a radiation exposure dose management apparatus according to a first embodiment.

Exemplary embodiments will be explained below, with reference to the accompanying drawings. In the following embodiments, some of the elements referred to by using the same reference characters are assumed to be elements that perform the same operations. Thus, duplicate explanations thereof will be omitted as appropriate.

Because ionizing radiation has potential risks as commonly known, evaluating radiation doses is an important issue in CT studies. Among methods for evaluating radiation doses of subjects, a Monte Carlo estimation method (MC) is a calculation method commonly used for estimating a specific radiation exposure dose of a patient. However, because the reaction speed thereof is too slow, it is difficult to apply the method to general use. As an alternative having a faster speed, another calculation method using an analytical approximation method in place of the Monte Carlo estimation method (MC) is known, by which a specific conversion factor of the patient is applied to CTDIvol, while phantom data acquired in advance is used. However, accuracy thereof is lower.

To achieve both a high precision level and high performance, the present embodiments use a preferred estimation method. For example, by using a deep learning method, a Monte Carlo (MC) radiation exposure dose model is generated by using a Deep Convolutional Neural Network (DCNN). A basic principle thereof is to train a U network, so that the three-dimensional U network receives an input of double-channel data structured with a CT image and a primary radiation exposure dose estimation and reproduces a corresponding Monte Carlo (MC) radiation exposure dose estimation. As for the specific method for realizing this scheme, explanations thereof will be omitted by citing "Real-Time Patient-Specific CT Dose Estimation using a Deep Convolutional Neural Network", Joscha Maier, Elias Eulig, Sabrina Dorn, Stefan Sawall, and Marc Kachelrieβ, Senior Member, The Institute of Electrical and Electronics Engineers (IEEE).

By using the trained radiation exposure dose model, it is possible to calculate, in a real-time manner, a voxel radiation dose distribution map of a CT image input to the radiation exposure dose model.

Figure 9B:
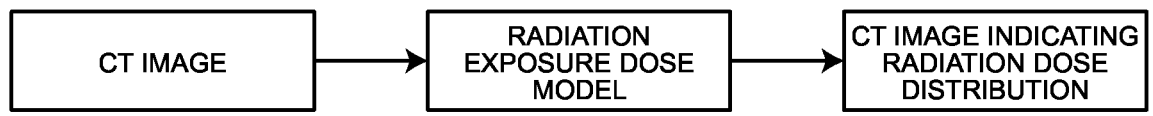
FIG. 9B is a schematic chart illustrating application of a trained radiation exposure dose model.
Figure 10:
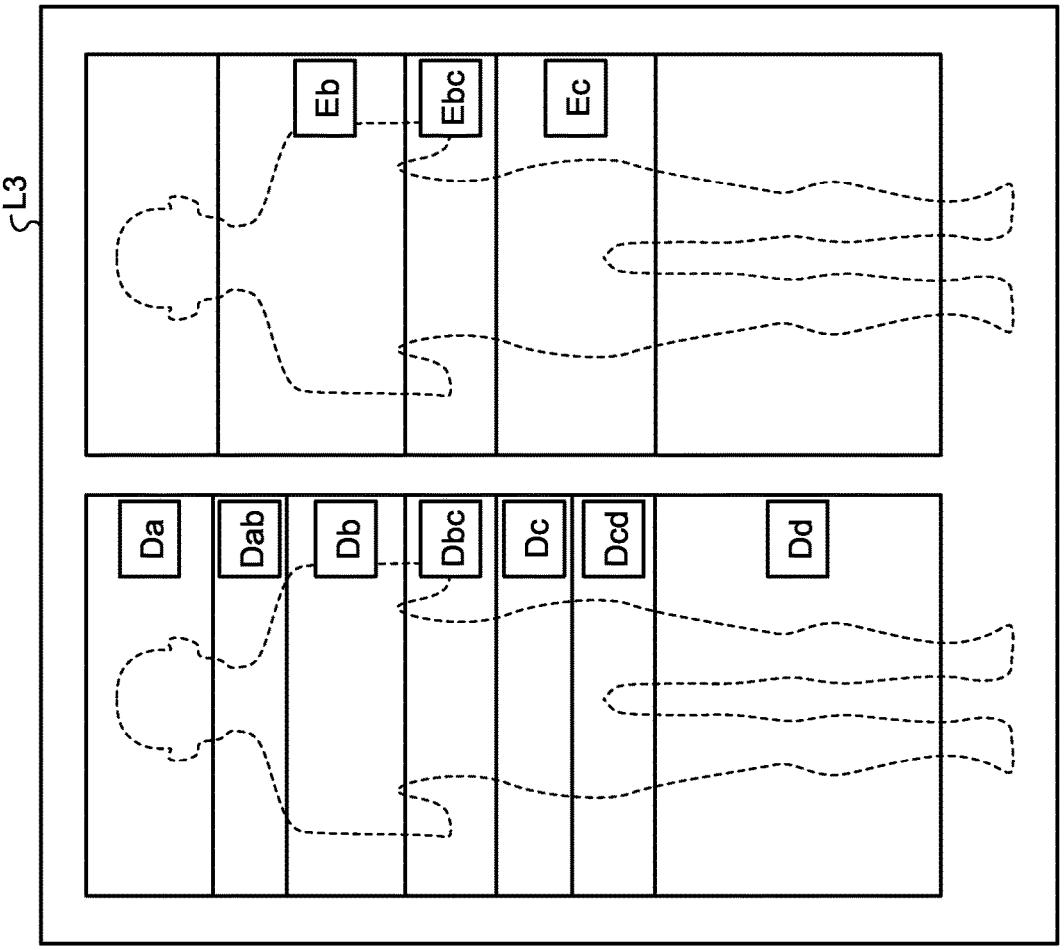
FIG. 10 is a drawing illustrating a scheme for accumulating radiation exposure doses according to a conventional technique.

FIGS. 9A and 9B illustrate a training process of the radiation exposure dose model and an application process of the radiation exposure dose model, respectively. As illustrated in FIG. 9A, in the training process of the radiation exposure dose model, the radiation exposure dose model is trained according to a deep learning method by using CT images and primary radiation dose estimation results. After the training is finished, as illustrated in FIG. 9B, a CT image to be analyzed is input to the trained radiation exposure dose model, so as to obtain a radiation exposure dose distribution map of the voxels in the CT image (which may be referred to as a voxel radiation dose distribution map). The voxel radiation dose distribution map indicates an estimated value of the radiation dose received by each of the voxels in the CT image, while a distribution of colors or a distribution of grayscale levels indicates the magnitudes of the received radiation exposure doses.

Alternatively, in the training process of the voxel radiation exposure dose model, the voxel radiation exposure dose model may be trained according to a deep learning method by using CT image data and Positron Emission Tomography (PET) image data. After the training is finished, CT image data and PET image data to be analyzed may be input to the trained radiation exposure dose model, so as to obtain a voxel radiation dose distribution map. As for the method for generating the voxel radiation dose distribution map on the basis of the PET-CT images, explanations thereof will be omitted by citing "Deep-dose: a voxel dose estimation method using deep convolutional neural network for personalized internal dosimetry", Min Sun Lee 1, Donghwi Hwang 1, 2, Joong Hyun Kim 3 & Jae Sung Lee, www.nature.com/scientificreports.

In this situation, "Deep-dose: a voxel dose estimation method using deep convolutional neural network for personalized internal dosimetry" is applied to a Single Photon Emission Computed Tomography (SPECT)-CT image. After the training of the radiation exposure dose model is finished, CT image data and SPECT image data to be analyzed are input to the trained radiation exposure dose model, so as to be able to similarly obtain a voxel radiation dose distribution map.

The methods for generating the radiation exposure dose models described above are preferred methods used in the present disclosure. However, needless to say, however, it is also acceptable to use other methods for generating a radiation exposure dose model.

Any of the radiation exposure dose models described above may be used by a radiation exposure dose management apparatus according to the embodiments. For example, the radiation exposure dose management apparatus may be one selected from among: an X-ray CT apparatus, a PET-CT apparatus, a SPECT-CT apparatus, and an X-ray diagnosis apparatus capable of taking a three-dimensional image. Examples of the X-ray diagnosis apparatus capable of taking a three-dimensional image include an X-ray diagnosis apparatus including a C-arm and a mammography apparatus capable of performing tomosynthesis imaging. A number of embodiments will be explained below. Further, although the present examples use only radiation exposure dose models in three modalities, possible embodiments are not limited to these examples.

First Embodiment

FIG. 1A is a schematic diagram illustrating a radiation exposure dose management apparatus according to a first embodiment.

The radiation exposure dose management apparatus according to the present embodiment is configured to search for and to obtain a scan result of a certain scan and is capable of calculating radiation doses imposed on organs by the scan, while using the obtained scan result. The scans in the present embodiment are each a scan imaging process (e.g., a CT scan) that causes ionizing radiation.

Sensitivity to radiation varies among organs. Examples of organs sensitive to radiation include the crystalline lens, the thyroid gland, and the genitals (e.g., the uterus, the ovaries). Even with the same radiation dose, organs sensitive to radiation are damaged more. Thus, there is a demand for the capability of accurately understanding received radiation doses in accordance with organs, while distinguishing the organs from one another.

A radiation exposure dose management apparatus 10 includes an obtaining unit 11, an organ segmenting unit 12, a voxel radiation dose distribution map generating unit 13, and an organ radiation dose calculating unit 14.

Figure 1B:
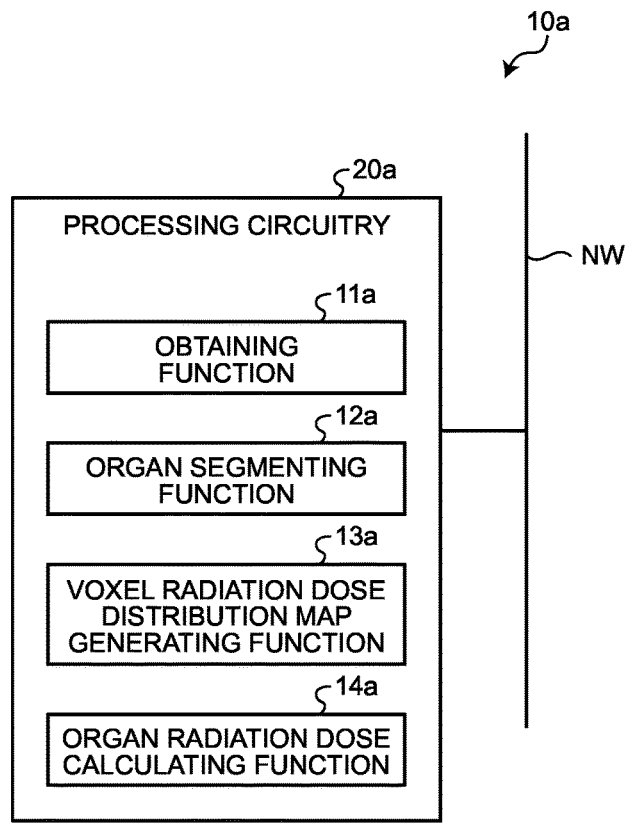
FIG. 1B is a block diagram illustrating an exemplary configuration of the radiation exposure dose management apparatus according to the first embodiment.

Further, FIG. 1B illustrates an exemplary configuration of the radiation exposure dose management apparatus 10. FIG. 1B illustrates, as an example of the radiation exposure dose management apparatus 10, a radiation exposure dose management apparatus 10a including processing circuitry 20a. Via a network NW, the processing circuitry 20a is capable to transmitting and receiving data to and from an external device such as a storage device configured to save therein past scan results, for example.

The processing circuitry 20a is configured to control operations of the entirety of the radiation exposure dose management apparatus 10a, by implementing an obtaining function 11a, an organ segmenting function 12a, a voxel radiation dose distribution map generating function 13a, and an organ radiation dose calculating function 14a. The obtaining function 11a is an example of the obtaining unit 11. The organ segmenting function 12a is an example of the organ segmenting unit 12. The voxel radiation dose distribution map generating function 13a is an example of the voxel radiation dose distribution map generating unit 13. The organ radiation dose calculating function 14a is an example of the organ radiation dose calculating unit 14.

The obtaining unit 11 is configured to obtain image data of interest on the basis of an input from a scan console. The image data is image data generated by performing a scan (e.g., a CT scan) that causes ionizing radiation, on a subject (hereinafter, "patient"). A medical doctor is able to obtain the image data from the scan, by inputting user information of the patient to the scan console and subsequently conducting a search for the certain scan of interest by using the user information of the patient. In an example, the medical doctor may wish to find out a radiation dose received by the patient in the immediately preceding scan. In that situation, the obtaining unit 11 is configured to obtain image data from the immediately preceding scan.

Figure 2A:
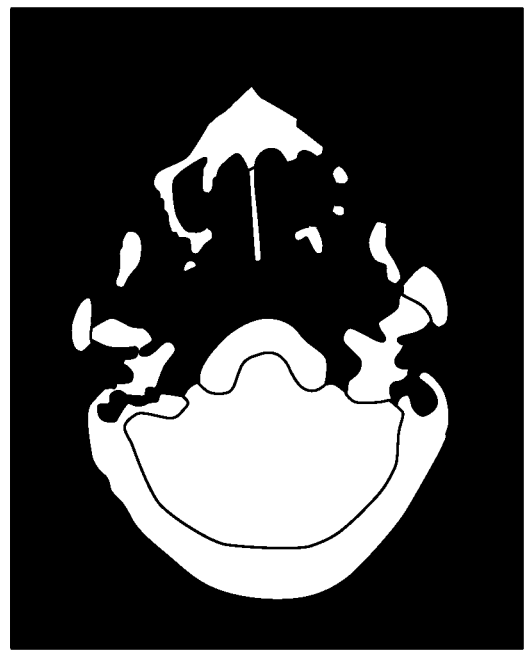
FIG. 2A is a schematic drawing illustrating a segmentation process performed by an organ segmenting unit according to the first embodiment.

The organ segmenting unit 12 is configured to segment the image data obtained by the obtaining unit 11, in accordance with organs of the patient. FIG. 2A is a schematic drawing illustrating a result of a segmentation process using an organ segmentation method according to a conventional technique. In FIG. 2A, an examined site is a skull region; the part indicated with a grid pattern denotes the cerebellum being segmented; the part indicated with the horizontal stripe denotes the skull being segmented; and the part indicated with the vertical stripe denotes an ear structure. However, possible embodiments are not limited to the method for segmenting the organs and the examined site to be segmented. It is acceptable to use any method and to segment any examined site. Further, in the present embodiment, a focus is placed on radiation exposure doses of organs, in particular, a radiation exposure dose of a certain organ sensitive to radiation. For this reason, the organ sensitive to radiation that has been segmented may be displayed with an emphasis.

The voxel radiation dose distribution map generating unit 13 is configured to generate a voxel radiation dose distribution map indicating a radiation exposure dose of each of the voxels, by using the trained radiation exposure dose model described above and the obtained image data of the patient. As explained above, the voxel radiation dose distribution map generating unit 13 is configured to input the obtained image data of the patient to the trained radiation exposure dose model and to subsequently output a voxel radiation dose distribution map indicating a distribution of the voxels within the image data, as an output. The voxel radiation dose distribution map is expressed with depths of colors or grayscale levels, for example, according to the magnitudes of estimated values of the radiation doses received by the voxels.

Further, possible methods for estimating the radiation exposure doses of the voxels implemented by the voxel radiation dose distribution map generating unit 13 are not limited to the example described above. For example, in addition to the image data of the patient, a radiation emission amount set as an image taking condition for taking the image data may be added to the input data for the radiation exposure dose model. Alternatively, it is also possible to estimate the radiation exposure dose of each of the voxels without using the radiation exposure dose model. For example, the voxel radiation dose distribution map generating unit 13 may be configured to obtain distribution data of linear attenuation coefficients on the basis of the image data of the patient. On the basis of the distribution data of the linear attenuation coefficients and the radiation emission amount set as the image taking condition, it is possible to calculate the radiation exposure dose of each of the voxels.

Figure 2B:
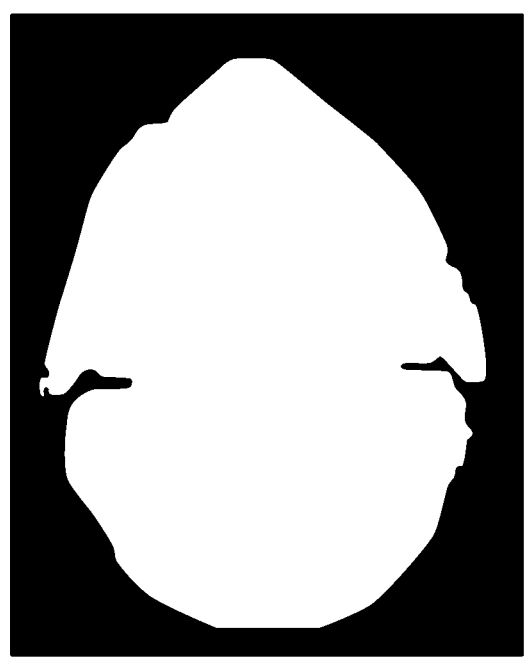
FIG. 2B is a schematic drawing illustrating a voxel radiation dose distribution map generated by a voxel radiation dose distribution map generating unit.

As an example, FIG. 2B illustrates a situation in which a voxel radiation dose distribution map is generated by using the same image data as the image data used in FIG. 2A. In FIG. 2B, the magnitudes of the received radiation exposure doses are expressed by using depths of grayscale levels. The grayscale values of the pixels in the drawing express the magnitudes of the radiation doses received by the voxels. Further, although FIG. 2B indicates the magnitudes of the radiation doses by using the grayscale levels (brightness), it is also acceptable to express the magnitudes of the radiation doses by using various chromas or hues for convenience in observation. Furthermore, for convenience in depiction of the drawing, FIG. 2B schematically illustrates changes in the radiation exposure dose in each of the parts and may not reflect reality.

Figure 2C:
FIG. 2C is a schematic drawing illustrating managing a radiation dose received by each voxel in accordance with organs.

The organ radiation dose calculating unit 14 is configured to calculate a radiation dose received by each of the organs, on the basis of the segmented image data of the organs and the radiation dose received by each of the voxels in the generated voxel radiation dose distribution map. FIG. 2C illustrates an example indicating the radiation dose received by each of the voxels in the organs. For convenience in observation, the boundary of each of the organs may be displayed with an emphasis. Further, the boundary of a certain organ sensitive to radiation may be displayed with an emphasis.

The organ radiation dose calculating unit 14 is configured to receive an input of the voxel radiation dose distribution map generated by the voxel radiation dose distribution map generating unit and a segmentation result from the segmentation process performed by the organ segmenting unit and to perform calculation by using Expression (1) presented below and is thus able to obtain a radiation exposure dose value of each of the organs, in accordance with the organs.

$$D_T = \frac{\int_T D(X, Y, Z) * \rho(X, Y, Z) * dV}{\int_T \rho(X, Y, Z) * dV} \quad (1)$$

In Expression (1), the notation DT denotes a radiation dose received by an organ, whereas the letter V denotes the volume of an organ region. The notation D(X,Y,Z) denotes a radiation dose received by the voxels (X,Y,Z), whereas the notation ρ(X,Y,Z) denotes the mass density of the voxels.

From the calculation based on Expression (1) presented above, the radiation dose received by each organ region is estimated as an average radiation exposure dose in the organ region.

Due to the risks of ionizing radiation, medical doctors may wish to find out, before starting a scan, a radiation dose that has been received by a patient, so as to ensure health and safety of the patient undergoing the radiation. In an example, before the current scan is started, image data from a past scan (which may be referred to as "history scan") of the patient may be searched for and obtained, for instance. By understanding the past radiation exposure dose, it is possible to adjust a scanning scheme or to provide a special protection for certain organs sensitive to radiation.

In FIG. 3, steps 100 through 500 (S100 through S500) represent a flowchart of a management method implemented by the radiation exposure dose management apparatus according to the present embodiment.

At step S100, a medical doctor inputs patient information (which may be referred to "subject information") to the scan console.

At step S200, on the basis of the input patient information, the obtaining unit searches for and obtains image data of interest from within a database. At step S200, the medical doctor is able to obtain information such as whether the patient is to be scanned for the first time and when the patient was scanned, as well as a scan image acquired in the previous scan. In an example, as for the image data of interest, the obtaining unit may obtain image data from a past scan associated with the patient information, in order to understand a radiation exposure status in the past, for example.

At step S300, the voxel radiation dose distribution map generating unit 13 generates a voxel radiation dose distribution map indicating a distribution of the voxels in the image data, on the basis of the obtained image data and the trained model.

At step S400, by using the image data obtained at step S200, the organ segmenting unit segments the organs in the image data in accordance with the organs and identifies the boundaries of the organs.

At step S500, a radiation exposure dose received by each of the organs is calculated, by using the voxel radiation dose distribution map calculated at step S300 and the organs segmented at step S400.

In this situation, any of the results from the steps may be displayed on the scan console or the like. Further, the order in which the steps are performed is not limited to the order indicated in FIG. 3. For example, step S300 and step S400 may be performed in reverse order. In another example, step S300 and step S400 may be performed simultaneously.

In the description above, the example was explained in which, at step S200, the certain scan result from the past scan is used for calculating the radiation doses imposed on the organs by that scan. However, the user may wish to find out a radiation dose imposed on organs by a current scan (a main scan at present time). In that situation, it is also acceptable to calculate the radiation doses imposed on the organs by the current scan.

On such occasion, at step S200, after scan imaging such as a CT scan that causes certain ionizing radiation is performed, the obtaining unit obtains image data from the current scan, so that radiation doses received by the organs are analyzed while using the obtained image data as an analysis target.

With the configuration according to the first embodiment, it is possible to calculate the radiation doses received by the organs, in particular, certain organs sensitive to radiation.

MODIFICATION EXAMPLES

In the first embodiment, the example was explained in which the radiation doses of the organs are calculated by using the image data acquired in the past scan or the current scan.

However, it is also acceptable to at first perform a position determining scan before starting a main scan. The position determining scan is the first scan program in an image examination, so that a generated position determining image can be used for determining a scan range and a scan cross-section. After that, by using the scan range and the scan cross-section determined from the position determining image, as well as selected scan parameters of a scan program, it is possible to perform a simulation on an image generated by using the scan program. The position determining scan is a pre-scan performed before the main scan is started, and an extremely smaller radiation dose is received therefrom, compared to what is received from the main scan. By performing the position determining scan, it is possible to estimate a radiation dose to be received by the patient when the main scan is performed.

FIG. 4 is a flowchart illustrating a management method implemented by a modification example of the radiation exposure dose management apparatus according to the first embodiment. In FIG. 4, at step S200', a position determining scan is performed so as to simulate a main scan. Subsequently, the obtaining unit obtains image data resulting from the simulation, and radiation doses received by the organs are calculated by using the obtained image data as an analysis target.

With this configuration, it is also possible to calculate the radiation doses received by the organs, in particular, certain organs sensitive to radiation. Further, when the position determining image is used for the simulation of the radiation doses in the main scan, it is possible to estimate the radiation doses in the main scan with a small radiation exposure dose.

Second Embodiment

A difference between a second embodiment and the first embodiment lies in that a radiation exposure dose management apparatus 10' according to the second embodiment further includes a correcting unit 15 configured to correct the radiation exposure dose of each of the voxels in the voxel radiation dose distribution map, on the basis of a specific correction factor.

Next, the difference between the first embodiment and the second embodiment will be explained. Explanations of certain elements that are the same will be omitted.

The researchers of the present disclosure discovered that, although tissue cells in human bodies are damaged when being exposed to radiation, the cells go through a self-repair process so that the number of damaged cells decreases over the course of time. Further, the number of damaged cells is directly proportional to radiation exposure doses. Accordingly, as human bodies go through the self-repair process, a radiation exposure dose remaining in each body decreases.

Consequently, if the radiation dose received by each organ was calculated by using only the radiation exposure dose distribution map obtained at the time of a scan, without taking the self-repair function of the organs into account, the calculated radiation exposure doses would be inaccurate.

Figure 5A:
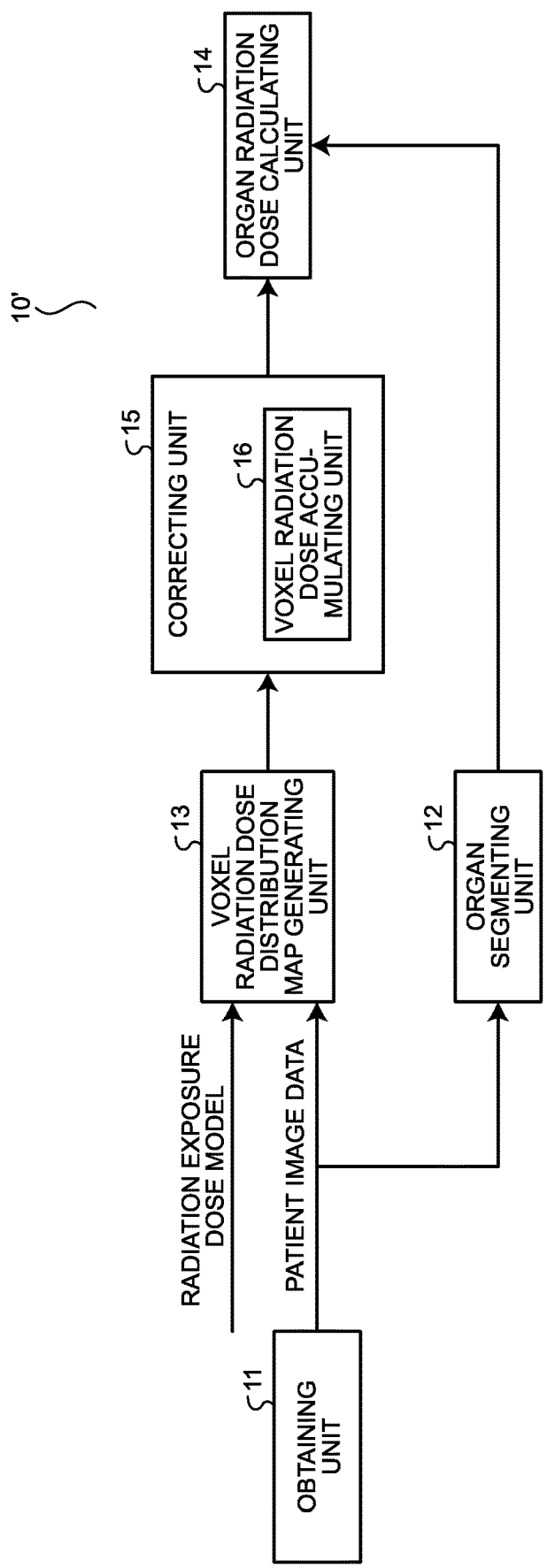
FIG. 5A is a schematic diagram illustrating a radiation exposure dose management apparatus according to a second embodiment.
Figure 5B:
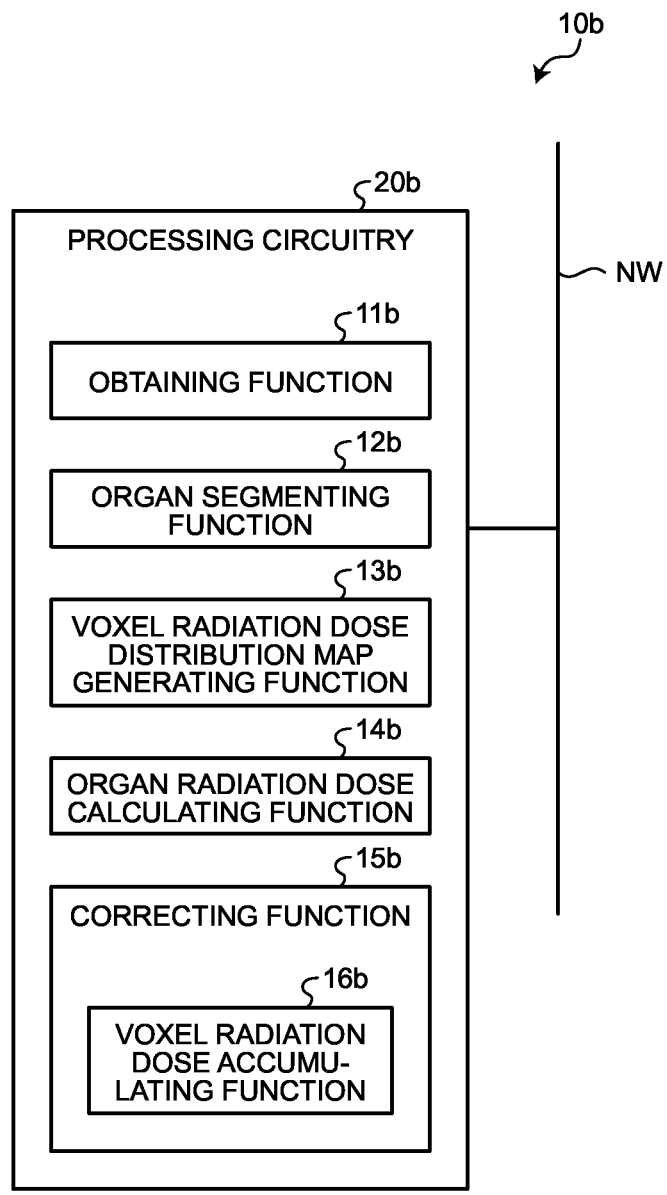
FIG. 5B is a block diagram illustrating an exemplary configuration of the radiation exposure dose management apparatus according to the second embodiment.

On the basis of the abovementioned recognition, in the second embodiment, the correcting unit 15 is added as illustrated in FIG. 5A. Further, FIG. 5B illustrates an exemplary configuration of the radiation exposure dose management apparatus 10 according to the second embodiment. As an example of the radiation exposure dose management apparatus 10, FIG. 5B illustrates a radiation exposure dose management apparatus 10b including processing circuitry 20b.

The processing circuitry 20b is configured to control operations of the entirety of the radiation exposure dose management apparatus 10b, by implementing an obtaining function 11b, an organ segmenting function 12b, a voxel radiation dose distribution map generating function 13b, an organ radiation dose calculating function 14b, and a correcting function 15b including a voxel radiation dose accumulating function 16b. The obtaining function 11b is the same function as the obtaining function 11a and is an example of the obtaining unit 11. The organ segmenting function 12b is the same function as the organ segmenting function 12a and is an example of the organ segmenting unit 12. The voxel radiation dose distribution map generating function 13b is the same function as the voxel radiation dose distribution map generating function 13a and is an example of the voxel radiation dose distribution map generating unit 13. The organ radiation dose calculating function 14b is the same function as the organ radiation dose calculating function 14a and is an example of the organ radiation dose calculating unit 14. The correcting function 15b is an example of the correcting unit 15. The voxel radiation dose accumulating function 16b is an example of a voxel radiation dose accumulating unit 16.

The correcting unit 15 is configured to receive an input of the voxel radiation dose distribution map output from the voxel radiation dose distribution map generating unit, to correct the radiation exposure dose of each of the voxels in the voxel radiation dose distribution map on the basis of the specific correction factor, and to output a result of the correction to the organ radiation dose calculating unit 14. The correction factor is a repair constant unique to an elapsed time period since a radiation exposure and to each of the organs.

It is possible to express the corrected radiation exposure dose (which may be referred to as "residual radiation exposure dose" or "residual radiation dose") of each of the voxels by using Expression (2) presented below.

$$D_t = D * \exp(-\mu t) \quad (2)$$

Figure 6:
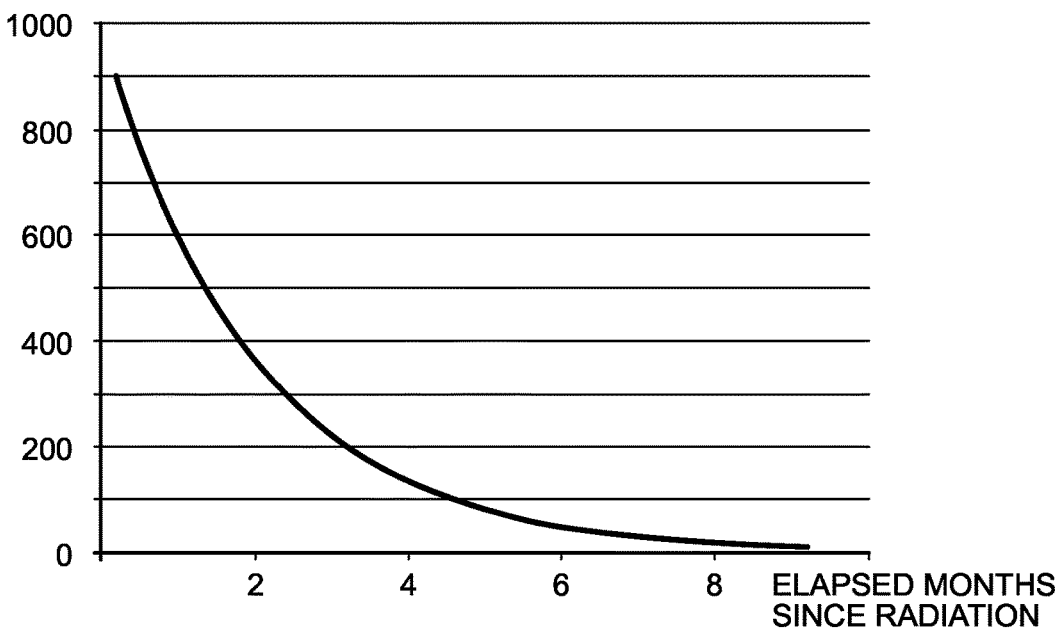
FIG. 6 is a curve chart illustrating changes in a residual radiation exposure dose over the course of time.

In Expression (2), the letter D denotes a radiation exposure dose immediately after the voxel receives radiation. The letter t denotes an elapsed time period since the radiation exposure. The notation Dt denotes a residual radiation dose of the voxel, after a time element and a repair constant of each organ are taken into consideration. FIG. 6 presents a curve chart illustrating changes in the residual radiation dose Dt over the course of time. As time elapses, the residual radiation dose in the body of the patient rapidly decreases. The letter μ denotes the repair constant related to the self-repair capabilities of the cells. Because the self-repair capabilities vary among cells, the repair constant μ varies among organs. Different organs have different curve charts indicating changes in the residual radiation dose Dt over the course of time.

When "t=0" is satisfied, the obtained image data is image data acquired immediately after a scan at present time is performed. The corrected radiation exposure dose from the scan is equal to the radiation exposure dose without the correction.

By using the calculation formula presented above, it is possible to calculate a corrected radiation exposure dose (a residual radiation dose) of each of the voxels.

Subsequently, the result of the correction made by the correcting unit 15 is output to the organ radiation dose calculating unit 14, so that the organ radiation dose calculating unit 14 calculates residual radiation doses of the organs.

As explained above, the organ radiation dose calculating unit 14 is configured to calculate a corrected radiation exposure dose (a residual radiation dose) of each of the organs, on the basis of the segmented image data of the organs and the calculated corrected radiation exposure dose (the residual radiation dose) of each of the voxels.

Further, because there is a possibility that a scan may have been performed on the same patient multiple times, it is necessary to calculate an accumulated corrected radiation dose of each of the voxels, by accumulating corrected results from the multiple times of scan and to further calculate an accumulated corrected radiation dose of each of the organs.

To attain the abovementioned goal, the correcting unit 15 further includes a voxel radiation dose accumulating unit 16 configured, in the situation where the obtaining unit 11 has obtained pieces of image data from the scan performed multiple times, whereas the voxel radiation dose distribution map generating unit 13 has generated a voxel radiation dose distribution map for each of the pieces of image data, to calculate a corrected voxel radiation dose accumulated value of each of the voxels by adding together corrected voxel radiation doses of corresponding voxels each from a different one of the pieces of image data.

It is possible to express the voxel radiation dose accumulated value by using Expression (3) presented below.

$$D_A = \Sigma Di * \exp(-\mu * ti) \quad (3)$$

In Expression (3), the letter i denotes the number of times of the scan. The notation ti denotes an elapsed time period since the radiation emission. For example, it is possible to express a current scan as "i=0", to express the immediately preceding scan as "i=1", to express the scan immediately preceding the last scan as "i=2", and so on. When "i=0" is satisfied, t0 is equal to 0, which means that no time has elapsed since the radiation exposure at the current time. When "i=1" is satisfied, t1 expresses a time period that had elapsed since the immediately preceding scan. When "i=2" is satisfied, t2 expresses a time period that had elapsed since the scan immediately preceding the last scan. The notation Di denotes the radiation dose that was received by the voxel immediately after each radiation emission was performed. The notation DA denotes an accumulated radiation dose value from corrected radiation exposure doses (residual radiation doses) of each of the voxels, after the time element and the repair constant of each organ are taken into consideration.

By using the calculation formula presented above, it is possible to obtain the accumulated radiation dose value corrected and accumulated over the scans with respect to each voxel.

Subsequently, an output of the voxel radiation dose accumulating unit 16 is output to the organ radiation dose calculating unit 14, so that the organ radiation dose calculating unit 14 calculates accumulated residual radiation doses of the organs.

With the configuration according to the second embodiment, it is possible to correct the radiation exposure dose of each of the voxels in the image data acquired from the scan performed multiple times and to obtain the accumulated residual radiation dose of each of the organs at present time.

Figure 7:
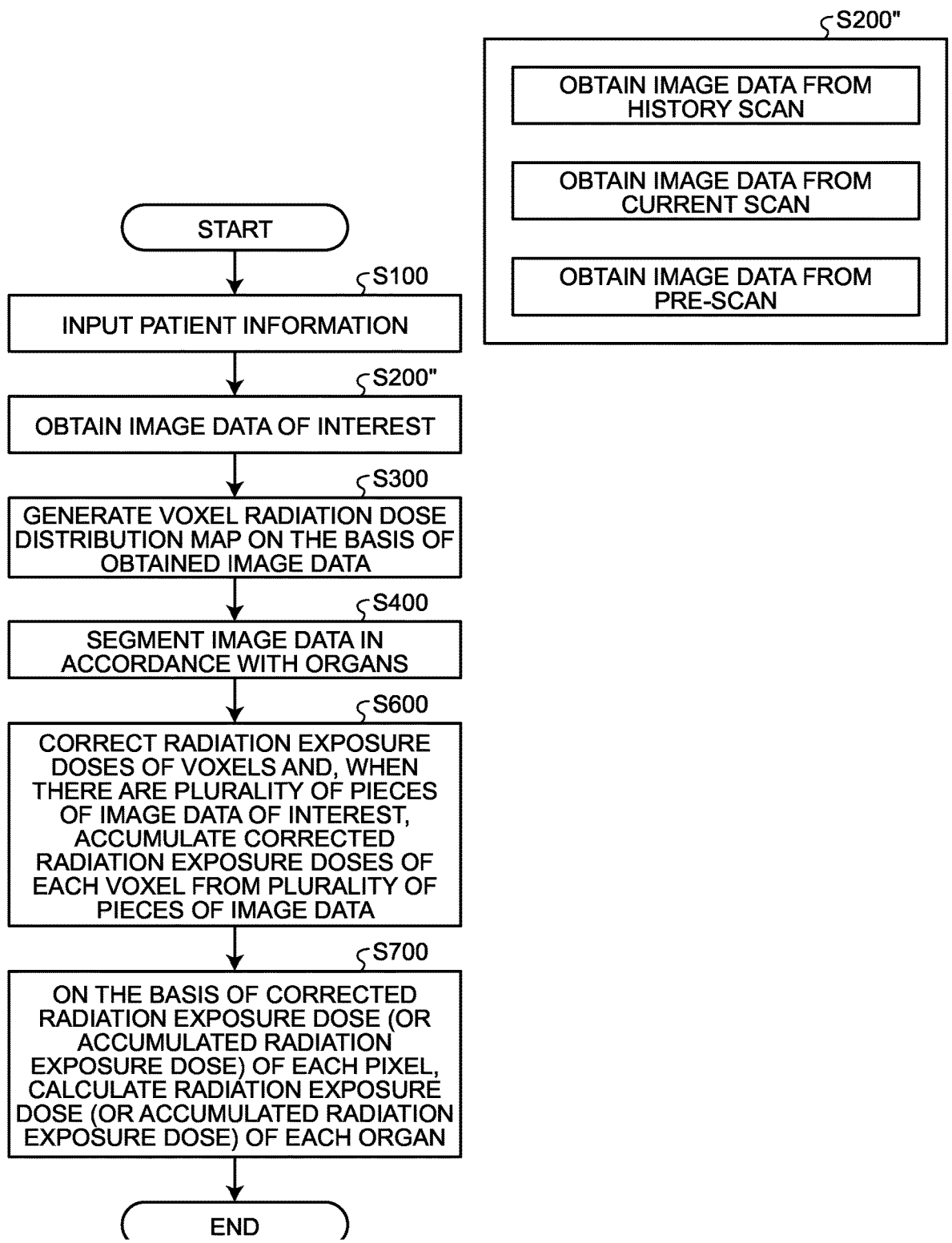
FIG. 7 is a flowchart illustrating a management method implemented by the radiation exposure dose management apparatus according to the second embodiment.

FIG. 7 is a flowchart illustrating a management method implemented by the radiation exposure dose management apparatus according to the second embodiment.

At step S100, a medical doctor inputs patient information (i.e., subject information) to the scan console.

At step S200", the obtaining unit obtains image data of interest. As described in the first embodiment, the image data of interest may be at least one selected from among: image data from a past scan; image data after a main scan at present time is performed; and image data (i.e., image data from a pre-scan) obtained by determining a scan range and a scan cross-section with a position determining scan and performing a simulation with the determined scan range and scan cross-section as well as selected scan parameters of a scan program. The image data of interest may be one piece of image data or two or more pieces of image data. When being two or more pieces of image data, the pieces of image data of interest may be a plurality of pieces of image data including image data from a plurality of past scans or may be a plurality of pieces of image data including image data from one or more past scans and image data of a main scan.

At step S300, the voxel radiation dose distribution map generating unit generates a voxel radiation dose distribution map indicating a distribution of the voxels in the image data, on the basis of the obtained image data and the trained model.

At step S400, the organ segmenting unit segments the organs in the image data in accordance with the organs, by using the image data obtained at step S200" and identifies the boundaries of the organs.

After that, unlike in the first embodiment, processes at steps S600 and S700 are performed in the second embodiment in place of step S500.

At step S600, when the obtaining unit has obtained the image data of interest, and the voxel radiation dose distribution map generating unit has generated the voxel radiation dose distribution map according to the obtained image data of interest, the correcting unit corrects the radiation exposure dose of each of the voxels in the voxel radiation dose distribution map on the basis of the specific correction factor and outputs the corrected result to the organ radiation dose calculating unit. When there are a plurality of pieces of image data of interest, the voxel radiation dose accumulating unit included in the correcting unit adds together the corrected voxel radiation doses of the corresponding voxels each from a different one of the obtained pieces of image data, so as to obtain and output the accumulated corrected radiation exposure dose of each voxel to the organ radiation dose calculating unit.

At step S700, the organ radiation dose calculating unit calculates a radiation exposure dose of each of the organs, on the basis of the corrected radiation exposure dose of each of the voxels. When there are a plurality of pieces of image data of interest, the organ radiation dose calculating unit calculates an accumulated radiation exposure dose of each of the organs, on the basis of the accumulated corrected radiation exposure dose of each of the voxels.

Further, although not clearly indicated above, any of the results from the steps may be displayed on the scan console or the like. Further, the order in which steps S300 and S400 are performed is not limited to the order indicated in FIG. 7. Step S300 and step S400 may be performed in reverse order. In another example, step S300 and step S400 may be performed simultaneously.

With the configuration according to the second embodiment, it is possible to correct the radiation exposure doses of the voxels in the image data obtained from the scans and to calculate the residual radiation exposure dose of each of the organs at present time. Further, it is also possible to correct the radiation exposure dose of the voxels in the image data acquired from the scan performed multiple times and to calculate the accumulated residual radiation exposure dose of each of the organs at present time.

Third Embodiment

A third embodiment is related to application of the calculated radiation exposure doses of the organs.

In the third embodiment, it is possible to issue an early warning about radiation risks on the basis of the calculated radiation exposure doses of the organs.

Certainty risks will be explained below. The certainty risks are used for describing cause-effect relationships between ionizing radiation and a number of side effects. So as to be distinguished from coincidental random risks (e.g., inducing cancer), the certainty risks may be referred to as non-random effects.

The certainty risks are determined on the basis of radiation doses, radiation dose rates, radiation volume, and radiation types. The certainty risks each have a threshold value, and there is no risk when the threshold value is not exceeded. There is a possibility that the threshold value may be extremely small, and threshold values vary among individuals. Nevertheless, once the threshold value is exceeded, the larger the received radiation dose is, the more serious the risk is.

Situations serving as examples of the certainty risks are indicated in Table 1:

TABLE 1

| Erythema on skin | 2 Gy-5 Gy |
| Irreversible skin damage | 20 Gy-40 Gy |
| Hair loss | 2 Gy-5 Gy |
| Infertility | 2 Gy-3 Gy |
| Cataract | 0.5 Gy |
| Fatality rate (whole body) | 3 Gy-5 Gy |
| Fetal malformation | 0.1 Gy-0.5 Gy |

In Table 1, Gray (Gy) is a unit of radiation absorption dose and indicates energy of ionizing radiation imposed on a substance per unit mass.

In the following sections, the crystalline lens will be explained as an example. The crystalline lens is a sensitive organ, and the cells die quickly when the received radiation dose exceeds a threshold value.

For example, there is a possibility that the eyes may be exposed to an X-ray range during a head CT, a paranasal sinus CT, an orbit CT, or neurotechnology surgery. There is a possibility that the eyes may receive a high radiation exposure dose, unless a proper protection is provided. Patients having a recurrent or chronic disease are required to undergo a CT examination constantly. For example, 26% of hydrocephalus patients receive a radiation dose of 150 millisievert (mSv) or more within three years. Among infant patients who repeatedly undergo head CT examinations, an average accumulated radiation dose received by the crystalline lenses of the eyes reaches 26 mGy within a number of years and has a possibility of reaching 1.3 Gy in some situations. For this reason, it is necessary to especially pay attention to received radiation doses.

In the present embodiment, a radiation exposure dose management apparatus is able to present a radiation exposure dose of each of the organs at present time in accordance with the organs, a threshold value for certainty risks for the organ, and information about an early warning.

For example, when the radiation exposure dose management apparatus according to the first and the second embodiments is used for managing a radiation exposure dose of the crystalline lenses, it is possible to cause the scan console to display presentation information such as "The radiation dose received by the organ: AAA", "The threshold value for certainty risks for the organ: XXX", and "The risk is extremely high when the threshold value XXX is exceeded". Consequently, on the basis of the obtained presentation information, medical doctors are able to determine a subsequent treatment plan.

Next, random risks will be explained. When cells have a mutation so that a genetic mutation or malignant metastasis is caused, a random cancer or genetic risk arises. Most of random risks have a late onset, and typical examples thereof include cancer. Random risks may be referred to as tissue-specific risks. On the basis of the radiation exposure dose or the accumulated radiation exposure dose of each of the organs obtained in the first and the second embodiments, it is possible to calculate an occurrence probability of a tissue-specific change in each of the organs. It is possible to express an occurrence probability P of a tissue-specific risk by using Expression (4) presented below.

$$P = r_T * D_T * W_R \qquad (4)$$

In Expression (4), the notation rT denotes a risk coefficient associated with a target area and the patient's age. Table 2 presented below indicates specific examples. The numerical values in the table indicate the numbers of cancer cases per radiation exposure dose of 100 mSv, while the sample size is 100,000 people. The notation DT denotes an accumulated organ radiation dose. The notation WR denotes a weight coefficient for radiation of which the value is equal to 1 for X-rays and γ-rays.

TABLE 2

| Tissue | Children | Adults | All ages |
| --- | --- | --- | --- |
| Stomach | 66 | 30 | 37 |
| Lungs | 373 | 166 | 208 |
| Colon | 203 | 96 | 118 |
| Liver | 32 | 14 | 18 |

TABLE 2-continued

| Tissue | Children | Adults | All ages |
| --- | --- | --- | --- |
| Bladder | 153 | 75 | 91 |
| Uterus | 37 | 14 | 19 |
| Ovaries | 76 | 28 | 37 |
| Prostate | 67 | 34 | 41 |
| Breasts | 865 | 160 | 299 |
| Thyroid gland | 200 | 18 | 54 |
| Leukemia | 133 | 68 | 82 |

In the present embodiment, the radiation exposure dose management apparatus is capable of presenting the radiation exposure dose of each of the organs at present time in accordance with the organs, the threshold value for the tissue-specific risk for the organ, and the information about the early warning. For example, it is possible to cause the scan console to display the presentation information such as "The radiation dose received by the organ: AAA", "The threshold value for a tissue-specific risk for the organ: XXX", and "The risk is extremely high when the threshold value XXX is exceeded". Consequently, on the basis of the obtained presentation information, medical doctors are able to determine a subsequent treatment plan.

To present the certainty risks and the random risks described above, the presentation may be realized by the display on the scan console as described above or may be realized with audio or the like.

With the configuration according to the third embodiment, it is possible to provide the medical doctors with reference information in abundance and to issue the early warning against the risks.

In the radiation exposure dose management apparatus 10a illustrated in FIG. 1B and the radiation exposure dose management apparatus 10b illustrated in FIG. 5B, the processing functions are stored in a memory in the form of computer-executable programs. The processing circuitry 20a and the processing circuitry 20b are each a processor configured to realize the functions corresponding to the programs, by reading and executing the programs from the memory. In other words, the processing circuitry that have read the programs have the functions corresponding to the read programs.

Although FIGS. 1B and 5B illustrate the examples in which the single processing circuitry realizes the various types of functions, it is also acceptable to structure processing circuitry by combining together a plurality of independent processors, so that the functions are realized as a result of the processors executing the programs. Further, the various types of functions of the processor may be realized as being distributed among or integrated together into single processing circuitry or a plurality of processing circuitry, as appropriate.

Further, the processing circuitry may be configured to realize the functions by employing a processor of an external device connected via the network NW. For example, the processing circuitry may be configured to realize the functions illustrated in FIG. 1B or FIG. 5B, by reading and executing the programs corresponding to the functions from a memory while employing a group of servers (a cloud) connected via the network NW as computation resources.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processor is a CPU, for example, one or more processors are configured to realize the functions by reading and executing the programs saved in a storage circuit. In contrast, when the processor is an ASIC, for example, instead of having the programs saved in a storage circuit, the functions are directly incorporated in the circuitry of one or more processors as a logic circuit. Further, the processors of any of the present embodiments do not each necessarily have to be structured as a single circuit. It is also acceptable to structure one processor by combining together a plurality of independent circuits so as to realize the functions thereof. Furthermore, it is also acceptable to integrate two or more of the constituent elements in the drawings into a processor, so as to realize the functions thereof.

In this situation, it is acceptable to configure a single memory element to store therein the programs corresponding to the processing functions of the processing circuitry or to provide a plurality of memory elements in a distributed manner so that a corresponding program is read from each of the individual memory elements. Further, instead of having the programs saved in one or more memory elements, it is also acceptable to directly incorporate programs in the circuitry of one or more processors. In that situation, the one or more processors are configured to realize the functions by reading and executing the programs incorporated in the circuitry thereof.

The constituent elements of the devices according to the above embodiments are based on functional concepts. Thus, it is not necessarily required to physically configure the constituent elements as indicated in the drawings. In other words, specific modes of distribution and integration of the devices are not limited to those illustrated in the drawings. It is acceptable to functionally or physically distribute or integrate all or a part of the devices in any arbitrary units, depending on various loads and the status of use. Further, all or an arbitrary part of the processing functions performed by the devices may be realized by a CPU and a program analyzed and executed by the CPU or may be realized as hardware using wired logic.

Further, it is possible to realize any of the radiation exposure dose management methods explained in the above embodiments, by causing a computer such as a personal computer or a workstation to execute a program prepared in advance. The program may be distributed via a network such as the Internet. Further, the program may also be executed, as being recorded on a non-transitory computer-readable recording medium such as a hard disk, a Flexible Disk (FD), a Compact Disk Read-Only Memory (CD-ROM), a Magneto Optical (MO) disk, a Digital Versatile Disk (DVD), or the like and being read by a computer from the recording medium.

According to at least one aspect of the embodiments described above, it is possible to accurately calculate the radiation exposure dose of each of the organs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radiation exposure dose management apparatus that manages a radiation dose received by a subject, the radiation exposure dose management apparatus comprising:
   processing circuitry configured to:
      obtain image data of the subject;
      segment the image data in accordance with organs of the subject;
      generate a voxel radiation dose distribution map indicating a radiation exposure dose of each of voxels based on a specific radiation exposure dose model and the image data;
      correct the radiation exposure dose of each of the voxels in the generated voxel radiation dose distribution map based on a specific correction factor; and
      calculate a radiation exposure dose of each of the organs based on the segmented image data and the corrected radiation exposure dose of each of the voxels in the generated voxel radiation dose distribution map.

2. The radiation exposure dose management apparatus according to claim 1, wherein the processing circuitry is further configured to calculate a corrected radiation exposure dose of each of the organs, based on the segmented image data and the corrected radiation exposure dose of each of the voxels in the generated voxel radiation dose distribution map.

3. The radiation exposure dose management apparatus according to claim 2, wherein the processing circuitry is further configured to further present a certainty risk and a random risk of each of the organs, based on the corrected radiation exposure dose of each of the organs in the generated voxel radiation dose distribution map.

4. The radiation exposure dose management apparatus according to claim 1, wherein
   when the subject has a plurality of pieces of image data, each serving as the image data, the processing circuitry is further configured to calculate a corrected voxel radiation dose accumulated value of each of the voxels, by adding together corrected voxel radiation doses of corresponding voxels, each from a different one of the plurality of pieces of image data, and
   the processing circuitry is further configured to calculate a corrected radiation exposure dose of each of the organs based on the segmented image data and the calculated corrected voxel radiation dose accumulated value of each of the voxels.

5. The radiation exposure dose management apparatus according to claim 1, wherein the specific correction factor used by the processing circuitry is a repair constant unique to an elapsed time period since a radiation exposure and to each of the organs.

6. The radiation exposure dose management apparatus according to claim 1, wherein
   the processing circuitry is further configured to obtain, as the image data, at least one selected from among: image data of the subject from a past scan; image data of a current scan; and image data of a pre-scan,
   the pre-scan is a position determining scan performed before the current scan, and
   when the obtained image data of the subject is the image data of the current scan, the image data is not to be corrected.

7. The radiation exposure dose management apparatus according to claim 1, wherein the processing circuitry is further configured to generate the specific radiation exposure dose model by using a Deep Convolutional Neural Network.

8. The radiation exposure dose management apparatus according to claim 1, wherein the processing circuitry is further configured to further cause a display to display the calculated radiation exposure dose of each of the organs.

9. The radiation exposure dose management apparatus according to claim 1, further comprising one of an X-ray Computed Tomography (CT) detector, a Positron Emission Tomography (PET)-CT detector, and a Single Photon Emission Computed Tomography (SPECT)-CT detector.

10. The radiation exposure dose management apparatus according to claim 1, wherein the processing circuitry is further configured to generate the specific radiation exposure dose model, which is a model trained to receive an input CT image and output a radiation dose distribution map for each voxel of the input CT image.

11. A radiation exposure dose management method for managing a radiation dose received by a subject, the radiation exposure dose management method comprising:
   obtaining image data of the subject;
   segmenting the image data in accordance with organs of the subject;
   generating a voxel radiation dose distribution map indicating a radiation exposure dose of each of voxels based on a specific radiation exposure dose model and the image data;
   correcting the radiation exposure dose of each of the voxels in the generated voxel radiation dose distribution map based on a specific correction factor; and
   calculating a radiation exposure dose of each of the organs based on the segmented image data and the corrected radiation exposure dose of each of the voxels in the generated voxel radiation dose distribution map.

12. The radiation exposure dose management method according to claim 11, further comprising generating the specific radiation exposure dose model, which is a model trained to receive an input CT image and output a radiation dose distribution map for each voxel of the input CT image.

13. A non-transitory computer-readable storage medium storing therein a program that, when executed, causes a computer to implement the radiation exposure dose management method according to claim 11.

* * * * *